UNITED STATES PATENT OFFICE.

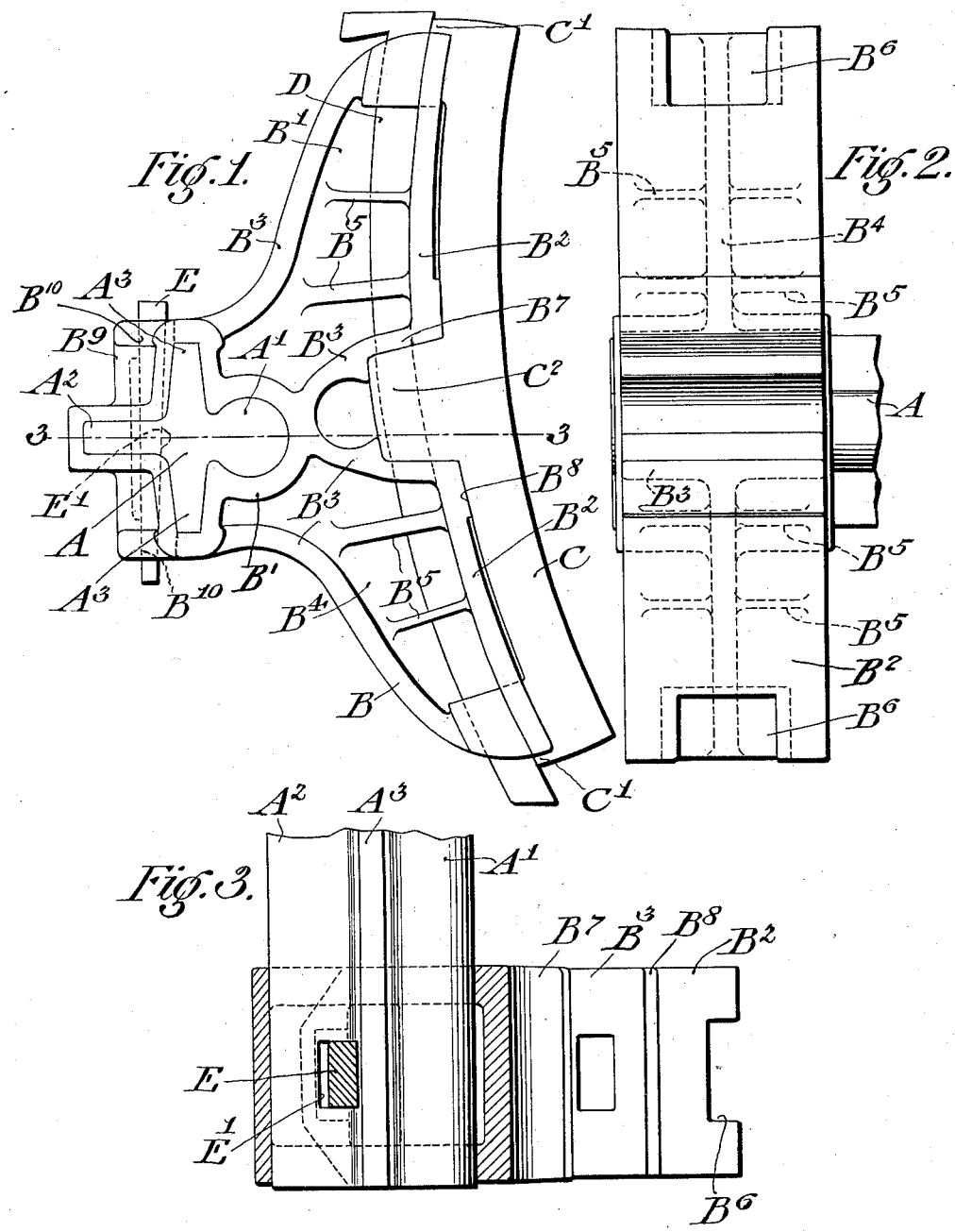

NATHAN H. DAVIS, OF PHILADELPHIA, PENNSYLVANIA.

BRAKE-HEAD.

1,043,807.   Specification of Letters Patent.   Patented Nov. 12, 1912.

Application filed January 27, 1909. Serial No. 474,589.

*To all whom it may concern:*

Be it known that I, NATHAN H. DAVIS, a citizen of the United States of America, residing in the city and county of Philadelphia, in the State of Pennsylvania, have invented a certain new and useful Improvement in Brake-Heads, of which the following is a true and exact description, reference being had to the accompanying drawings, which form a part thereof.

The present invention relates to brake heads which are secured to the ends of brake beams and normally have secured to them brake shoes which engage the tread portions of the car wheels in railway brake apparatus.

The main object of the present invention is the production of a practical brake head which is adapted to have the usual brake shoe detachably secured to it and characterized by an effective disposition of the metal composing it, whereby strength and durability are obtained with an avoidance of unnecessary weight and which is so formed that when a brake shoe becomes displaced while the car on which the brake apparatus is installed is in service and the brakes are thereafter applied, a portion of the tread surface of the corresponding car wheel will be engaged by a brake head portion so shaped and proportioned to stand such contact for a considerable period before wearing away sufficiently to permit the brake beam to engage the car wheel.

It occasionally happens in practice that a brake shoe becomes displaced either from a break or failure of the means employed for securing the brake shoe to the brake head, or, because of the total wearing away of the brake shoe. In such case, the brake head is, of course, brought directly into engagement with the car wheel when the brakes are thereafter employed. Heretofore, so far as I am aware, brake heads suitable for, and actually in, general use have not been formed to resist wearing contact with a wheel for any considerable length of time. In consequence, it has frequently happened that the brake head has not only been entirely worn away by such contact, but also that the brake beam itself has been seriously injured or even cut in two by contact with the flange of the car wheel when the conditions of service have been such that it was necessary to move the car a considerable distance before a convenient time and place was found for repairing the broken apparatus. While the wear of any improved brake head due to the contact with the car wheel if prolonged usually results in making the brake head useless, the special construction of the brake head which I have devised prevents the brake beam from being brought into contact with the flange of the car wheel and thereby injured for a considerable time, sufficient to allow the car to be moved to a place where repairs can readily be made. This greatly minimizes the damage to the brake apparatus following the displacement of the brake shoe while the car is in service, and also prevents the brake apparatus on the car from becoming ineffective, as is usually the case, when the displacement of the brake shoe results in wear sufficient to cause the end of the brake beam to be cut off by the flange of the car wheel.

A further object of my invention is to provide a simple and effective means for detachably securing a brake head in place on a brake beam having the cruciform cross-section at its ends, which is characteristic of the brake beam described and claimed in my prior Patent 683,729, granted October 1, 1901.

The various features of novelty which characterize my invention are pointed out with particularity in the claims annexed to and forming a part of this specification. For a better understanding of the invention, however, and the advantages possessed by it, reference may be had to the accompanying drawings and descriptive matter, in which I have illustrated and described one of the forms in which my invention may be embodied.

Figure 1 is an end elevation of a brake beam with brake head and shoe in place. Fig. 2 is an elevation of the brake head taken at right angles to Fig. 1; and Fig. 3 is a section taken on the line 3—3 of Fig. 1, but with the brake shoe removed.

In the drawings, A represents the brake beam, B the brake head, C the brake shoe, which may be of the usual standard form, and D the usual key for securing the brake shoe to the brake head. The brake head comprises a flanged or body portion $B^1$ which engages and is secured to the brake beam, and a wear surface $B^2$, located back of the brake shoe C and having its face adjacent the shoe, generally similar in location, extent of surface and configuration to the wheel engaging face of the brake shoe. The portions B¹ and B² of the brake head are secured together by the central web or rib B⁴ and the ribs or flanges B³ and B⁵, which provide the necessary mechanical strength and rigidity, while avoiding unnecessary weight in the brake head. Practically, the only difference in extent of surface and configuration between the face of the wear portion B² and the face of the standard brake shoe C is found in the provision in the wear portion of notches B⁶ to receive the lugs C¹ formed on the back side of the brake shoe at its ends and the opening B⁷ formed in the front side of the brake head to receive the lug C² formed at the middle of the back side of the brake shoe, and in the provision of slightly raised bearing surfaces B⁸ formed on the front face of the brake head at each side of the recesses B⁷, against which the brake shoe normally bears.

The brake head is secured in place by means of a key E which bears at its rear edge against the spaced apart surfaces B¹⁰ of a socket for the key formed in the key housing B⁹ provided on the rear side of the brake head portion B¹. A channel E¹ for the key E is formed through the horizontal flange A² of the brake beam, the brake beam shown being of the same character as the brake beam described and claimed in my said prior Patent No. 683,729, having the horizontal back flange A² and front flange A¹ of circular cross-section and vertically extending upper and lower tapered flanges A³. With the key E inclosed in the housing B⁹ and bearing adjacent its ends against the spaced apart bearing surfaces B¹⁰ and at the middle of its opposite edge against the front wall of socket E¹, the key is protected, while at the same time the elasticity of the key is effectively utilized in firmly securing the parts together and in the preventing of lost motion between the beam and head construction described, and insures a connection between the brake head and brake beam, which is separable and at the same time entirely reliable.

When the brake shoe C becomes displaced, which happens from time to time in practice while the car to which the brake shoe pertains is in service, the wear surface B² is brought into contact with the tread surface of the car wheel. The lugs or bearing surface B⁸ first come into contact with the car wheels, but these, of course, soon wear away and then contact between the brake head and the car wheel occurs along the entire front face of the wear portion B², the extent of wheel engaging surface of portion B² being practically the same as that of the brake shoe. The wear surface may be made of a thickness to resist the contact with the car wheel for such length of time as it is necessary to make provision for, without making the brake head unduly heavy. When the wear surface B² serves in lieu of the brake shoe, it holds the brake beam out of contact with the flange of the car wheel and at a sufficient distance from the car wheel to prevent interference with the successful operation of the brakes on the other wheels of the car.

Having now described my invention, what I claim as new and desire to secure by Letters Patent is:

1. A railway brake head adapted to have the usual brake shoe secured to it and formed with a wear face normally covered by the brake shoe and adapted to engage the tread of the car wheel when the brake shoe is displaced, said face being shaped like and having substantially the same extent of wheel engaging surface as the brake shoe and being of sufficient thickness to enable it to resist contact with the car wheel for a considerable period of time before being worn away, said brake head being formed also with a beam engaging portion and with a longitudinal flange connecting said beam engaging portion and said wear face substantially along the center line of the latter and transverse flanges connecting said longitudinal flange and said wear face and extending to the side edges of the latter.

2. In combination with a brake beam, the end portion of which comprises vertical upper and lower flanges and a rearwardly extending horizontal flange, in which is formed a passage for a key, a brake head having a socket shaped to receive said end portion, and a locking key for securing the brake head in place on the brake beam, said brake head having a key housing with a vertical key socket formed in it and provided with spaced apart bearing surfaces for the rear edge of the key, so located that when the locking key is in place, the rear edge of the key bears adjacent its ends against said bearing surfaces, while the middle portion of the front edge of the key bears against the front wall of said passage in the rearwardly extending flange.

NATHAN H. DAVIS.

Witnesses:
ARNOLD KATZ,
D. STEWART.